(12) United States Patent
Ha et al.

(10) Patent No.: US 12,196,969 B2
(45) Date of Patent: Jan. 14, 2025

(54) DISPLAY DEVICE

(71) Applicant: SAMSUNG ELECTRONICS CO., LTD., Suwon-si (KR)

(72) Inventors: Sangwoo Ha, Seongnam-si (KR); Tetsuo Ariyoshi, Seongnam-si (KR); Soomoon Park, Seoul (KR); Ilseop Won, Hwaseong-si (KR); Jongpil Won, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/840,064

(22) Filed: Jun. 14, 2022

(65) Prior Publication Data

US 2023/0011039 A1    Jan. 12, 2023

(30) Foreign Application Priority Data

Jul. 9, 2021    (KR) .................. 10-2021-0090547

(51) Int. Cl.
*G02B 27/01*        (2006.01)
*F21V 8/00*         (2006.01)
(Continued)

(52) U.S. Cl.
CPC ....... *G02B 27/0172* (2013.01); *G02B 6/0036* (2013.01); *G02B 6/0055* (2013.01); *G02B 27/0944* (2013.01); *G02B 27/4205* (2013.01); *G02B 5/18* (2013.01); *G02B 5/26* (2013.01); *G02B 6/0011* (2013.01); *G02B 6/0013* (2013.01); *G02B 6/0018* (2013.01);
(Continued)

(58) Field of Classification Search
CPC .............. G02B 27/017; G02B 27/0172; G02B 27/0944; G02B 27/283; G02B 27/4205; G02B 27/4261; G02B 5/18; G02B 5/26; G02B 6/0011; G02B 6/0013; G02B 6/0018; G02B 6/0031; G02B 6/0033; G02B 6/0036; G02B 6/0055; G02B 6/0056; G02B 2027/0118; G02B 2027/0123; G02B 2027/0132; G02B 2027/0147; G02B 2027/0178; G02B 2027/0179
USPC .......................................................... 345/8
See application file for complete search history.

(56) References Cited

U.S. PATENT DOCUMENTS 6,372,608 B1    4/2002    Shimoda et al.
6,645,830 B2    11/2003   Shimoda et al.
(Continued)

FOREIGN PATENT DOCUMENTS

KR    10-2210938 B1    2/2021
WO    2008/081070 A1   7/2008
WO    2020/217044 A1   10/2020

*Primary Examiner* — Jason M Mandeville
(74) *Attorney, Agent, or Firm* — Sughrue Mion, PLLC

(57) ABSTRACT

A display device includes a light guide plate; an input grating on a first surface of the light guide plate and configured to generate a diffracted transmission beam; an output grating on the first surface of the light guide plate and spaced apart from the input grating, wherein the output grating is configured to generate a first output beam emitted from the light guide plate; and an optical efficiency enhancement layer on a second surface of the light guide plate and overlapping at least one of the input grating and the output grating in a traveling direction of the input beam, the second surface being opposite to the first surface.

12 Claims, 10 Drawing Sheets

(51) Int. Cl.
*G02B 27/09* (2006.01)
*G02B 27/42* (2006.01)
G02B 5/18 (2006.01)
G02B 5/26 (2006.01)
G02B 27/28 (2006.01)

(52) U.S. Cl.
CPC .......... *G02B 6/0031* (2013.01); *G02B 6/0033* (2013.01); *G02B 2027/0118* (2013.01); *G02B 2027/0123* (2013.01); *G02B 2027/0132* (2013.01); *G02B 2027/0147* (2013.01); *G02B 2027/0178* (2013.01); *G02B 27/283* (2013.01); *G02B 27/4261* (2013.01)

(56) References Cited

U.S. PATENT DOCUMENTS

| | | | |
|---|---|---|---|
| RE38,466 E | 3/2004 | Inoue et al. |
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,288,758 B2 | 10/2007 | Sherrer et al. |
| 7,319,044 B2 | 1/2008 | Han et al. |
| 7,501,656 B2 | 3/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,399,944 B2 | 3/2013 | Kwak et al. |
| 8,432,511 B2 | 4/2013 | Jeong |
| 8,459,832 B2 | 6/2013 | Kim |
| 8,502,242 B2 | 8/2013 | Kim |
| 8,536,604 B2 | 9/2013 | Kwak et al. |
| 8,735,931 B2 | 5/2014 | Han et al. |
| 8,766,295 B2 | 7/2014 | Kim |
| 9,791,696 B2 * | 10/2017 | Woltman ............ G02B 27/0081 |
| 10,761,256 B2 * | 9/2020 | Dubinin .................. G02B 5/18 |
| 10,845,594 B1 | 11/2020 | Lam et al. |
| 10,895,678 B2 | 1/2021 | Kim et al. |
| 2017/0235142 A1 * | 8/2017 | Wall ........................ G02B 5/26 |
| | | 359/633 |
| 2019/0187482 A1 | 6/2019 | Lanman |
| 2019/0317264 A1 * | 10/2019 | Dubinin .............. G02B 6/0031 |
| 2020/0183152 A1 | 6/2020 | Pennell et al. |
| 2020/0326579 A1 | 10/2020 | Sato et al. |
| 2021/0063742 A1 | 3/2021 | Lee et al. |
| 2021/0341743 A1 * | 11/2021 | Lam .................... G02B 6/0016 |
| 2022/0146827 A1 * | 5/2022 | Vallius .................... G02B 5/18 |

* cited by examiner

DISPLAY DEVICE

CROSS-REFERENCE TO RELATED APPLICATION

This application is based on and claims priority under 35 U.S.C. § 119 to Korean Patent Application No. 10-2021-0090547, filed on Jul. 9, 2021, in the Korean Intellectual Property Office, the disclosure of which is incorporated by reference herein in its entirety.

BACKGROUND

The disclosure relates to a display device, and more particularly, to a display device configured to generate an augmented reality image, a virtual image, or the like.

A head-mounted display (HMD) is an image display device that may be worn on a user's head like glasses or a helmet to allow the user to enjoy large images. In general, an HMD is configured to provide a virtual image by enlarging a panel having a size of 1 inch or less through a plurality of optical systems. When an optical system of an HMD is designed by considering the size of a pupil, eye relief from the optical system for viewing a virtual image, magnification, a field of view (VOW), or the like to realize a virtual screen, many optical elements such as mirrors and half mirrors are required. Accordingly, an HMD in the related art has a disadvantage of being bulky and heavy, and the difficulty of a manufacturing operation thereof is high because a large number of elements need to be mounted in a narrow space.

When an HMD system is implemented by using a diffraction grating, the number of optical elements is significantly reduced, so that the system may be easily configured in a narrow space and is advantageous in weight reduction compared to the HMD system in the related art.

SUMMARY

The disclosure provides a display device having improved optical efficiency.

In accordance with an aspect of the disclosure, a display device includes a light guide plate; an input grating on a first surface of the light guide plate, the input grating being configured to diffract an input beam incident on the first surface at an angle equal to or greater than a critical angle of the light guide plate to generate a diffracted transmission beam propagating within the light guide plate through total internal reflection; an output grating on the first surface of the light guide plate and spaced apart from the input grating, wherein the output grating is configured to generate a first output beam passing through the output grating and emitted from the light guide plate by diffracting the diffracted transmission beam; and an optical efficiency enhancement layer on a second surface of the light guide plate and overlapping at least one of the input grating and the output grating in a traveling direction of the input beam, the second surface being opposite to the first surface.

In accordance with an aspect of the disclosure, a display device configured to output a first output beam and a second output beam based on an input beam includes a light guide plate; an input grating on a first surface of the light guide plate; an output grating on the first surface of the light guide plate and spaced apart from the input grating; and an optical efficiency enhancement layer arranged on a second surface of the light guide plate, the optical efficiency enhancement layer having a reflectance of 50% or more with respect to the input beam, wherein the first output beam is based on a diffracted transmission beam which is a first portion of the input beam diffracted by the input grating while passing through the input grating, and wherein the second output beam is based on a transmitted input beam which is a second portion of the input beam passing through the input grating and reflected by the optical efficiency enhancement layer.

In accordance with an aspect of the disclosure, a display device includes a first display device corresponding to a first input beam, a second display device corresponding to a second input beam, and a third display device corresponding to a third input beam, wherein the first display device includes a first light guide plate; a first input grating on a first upper surface of the first light guide plate; a first output grating on the first upper surface of the first light guide plate and spaced apart from the first input grating; and a first optical efficiency enhancement layer on a first lower surface of the first light guide plate, the first optical efficiency enhancement layer having a reflectance of 50% or more with respect to a first wavelength band of the first input beam, the first lower surface being opposite to the first upper surface, wherein the second display device includes a second light guide plate; a second input grating on a second upper surface of the second light guide plate; a second output grating on the second upper surface of the second light guide plate and spaced apart from the second input grating; and a second optical efficiency enhancement layer on a second lower surface of the second light guide plate, the second optical efficiency enhancement layer having a reflectance of 50% or more with respect to a second wavelength band of the second input beam, the second lower surface being opposite to the second upper surface, wherein the third display device includes a third light guide plate; a third input grating on a third upper surface of the third light guide plate; a third output grating on the third upper surface of the third light guide plate and spaced apart from the third input grating; and a third optical efficiency enhancement layer on a third lower surface of the third light guide plate, the third optical efficiency enhancement layer having a reflectance of 50% or more with respect to a third wavelength band of the third input beam, the third lower surface being opposite to the third upper surface, wherein the first input beam includes a blue visible beam, wherein the second input beam includes a green visible beam, and wherein the third input beam includes a red visible beam.

In accordance with an aspect of the disclosure, a display device includes a light guide plate; an input grating on a first surface of the light guide plate, the input grating being configured to reflect a portion of an input beam incident from a second surface of the light guide plate and diffract the portion of the input beam at an angle equal to or greater than a critical angle of the light guide plate, the second surface being opposite to the first surface; an output grating on the first surface of the light guide plate, spaced apart from the input grating, the output grating being configured to transmit and diffract a first portion of a first diffracted reflection beam, the first diffracted reflection beam being a portion of the input beam reflected and diffracted by the input grating; and an optical efficiency enhancement layer on the second surface of the light guide plate and overlapping the output grating in a traveling direction of the input beam.

In accordance with an aspect of the disclosure, a display device includes a light guide plate; a diffraction grating on a first surface of the light guide plate; and an optical efficiency enhancement layer on a second surface of the light guide plate, wherein the optical efficiency enhancement layer is positioned such that a light beam traveling through the light guide plate from the diffraction grating is reflected by the optical efficiency enhancement layer back toward the diffraction grating.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF THE EMBODIMENTS

Figure 1:
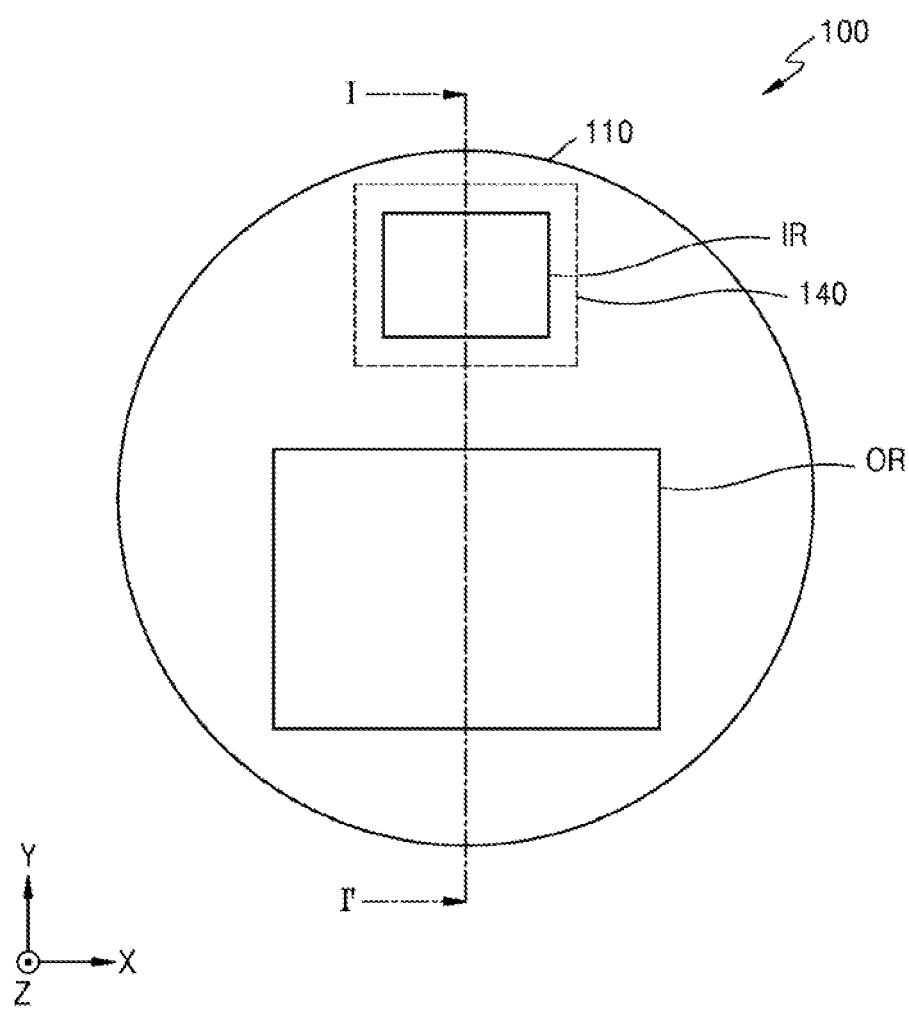
FIG. 1 is a plan view of a display device according to embodiments.

Hereinafter, embodiments of the disclosure will be described in detail with reference to the attached drawings. In the drawings, like reference numerals are used for like elements, and repeated description thereof will be omitted.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present. Like numerals refer to like elements throughout.

Spatially relative terms, such as "over," "above," "on," "upper," "below," "under," "beneath," "lower," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

For the sake of brevity, conventional elements to semiconductor devices may or may not be described in detail herein for brevity purposes.

FIG. 1 is a plan view of a display device 100 according to example embodiments.

Figure 2:
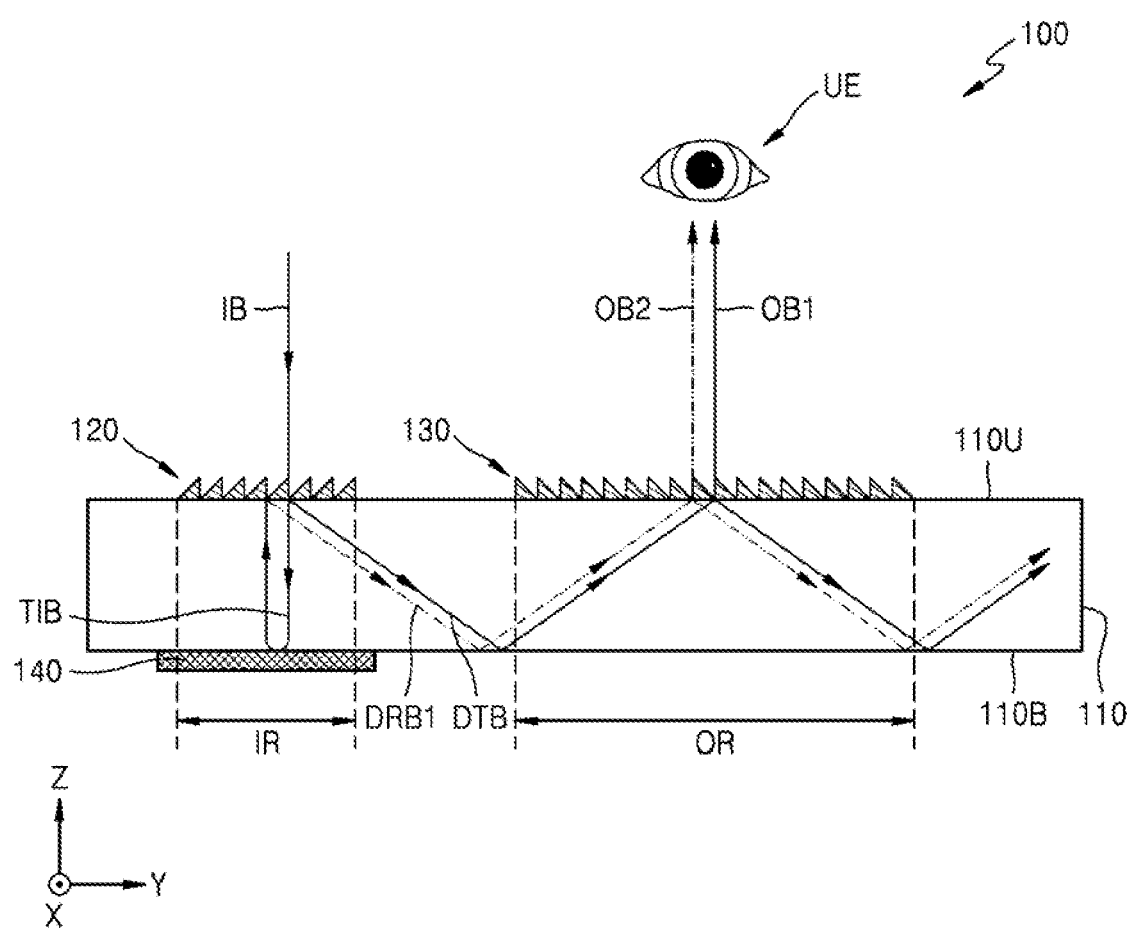
FIG. 2 is a cross-sectional view taken along line I-I' of FIG. 1.

FIG. 2 is a cross-sectional view taken along line I-I' of FIG. 1.

Referring to FIGS. 1 and 2, the display device 100 may include a light guide plate 110, an input grating 120, an output grating 130, and an optical efficiency enhancement layer 140.

The display device 100 may be configured to output first and second output beams OB1 and OB2 based on an input beam IB. The display device 100 may generate, for example, an augmented reality image, a virtual image, or the like, based on the input beam IB. An image generated by the display device 100 may be recognized by a user's eye UE as having a depth corresponding to a position of the light guide plate 110 or a position beyond the light guide plate 110 (that is, at a position spaced apart from the user's eye UE with the light guide plate 110 therebetween).

The light guide plate 110, the input grating 120, the output grating 130, and the optical efficiency enhancement layer 140 may constitute an optical system for guiding the input beam IB to the user's eye UE.

According to example embodiments, the input beam IB may be provided by an image generating device. The image generating device may include, for example, a display device such as an organic electro luminescence (EL) display, an inorganic EL display, a liquid crystal display (LCD), or the like. According to example embodiments, the image generating device may be included in the display device 100. According to example embodiments, the image generating device may also be a separate device from the display device 100.

According to example embodiments, the display device 100 may further include various optical elements for guiding the input beam IB to the light guide plate 110, such as an optical fiber, a focusing lens, a collimating lens, a mirror, or the like.

The light guide plate 110 may include a transparent material with respect to a visible light band. The light guide plate 110 may include, for example, plastic, glass, or the like. The light guide plate 110 may be a lens of a glasses-type product such as a head-mounted display (HMD), or may be a portion of a front glass of a head-up display (HUD). In FIG. 1, a planar shape of the light guide plate 110 is shown to be approximately circular, but this is only for illustration and the disclosure is not limited thereto.

According to example embodiments, the light guide plate 110 may have a substantially flat plate shape. According to example embodiments, the light guide plate 110 may also include a curved surface like a vision correcting lens. A direction in which the input beam IB is incident on the light guide plate 110 is defined as a Z direction, and two directions substantially perpendicular to the Z direction are defined as an X direction and a Y direction, respectively. The X direction and the Y direction may be substantially perpendicular to each other.

The input grating 120 and the output grating 130 may be on an upper surface 110U of the light guide plate 110. A portion of the light guide plate 110 on which the input grating 120 is disposed is defined as an input region IR, and a portion of the light guide plate 110 on which the output grating 130 is disposed is defined as an output region OR. According to example embodiments, the input grating 120 may be horizontally (that is, in either or both of the X direction and the Y direction) spaced apart from the output grating 130. Accordingly, the input region IR may be horizontally (that is, in the X direction and the Y direction) spaced apart from the output region OR. According to example embodiments, an area of the output region OR may be greater than an area of the input region IR. As the area of the output region OR increases, a size of an augmented reality image and/or a virtual image recognized by the user's eye UE may increase.

The optical efficiency enhancement layer 140 may be on a lower surface 110B of the light guide plate 110. The lower surface 110B may be opposite to the upper surface 110U. According to example embodiments, the optical efficiency enhancement layer 140 may overlap the input grating 120 in the Z direction. According to example embodiments, an area of the optical efficiency enhancement layer 140 may be greater than the area of the input region IR (or the input grating 120). According to example embodiments, a contour of the optical efficiency enhancement layer 140 may horizontally surround the input region IR (or the input grating 120) when viewed in the Z direction as shown, e.g., in FIG. 1.

In FIGS. 1 and 2, a planar shape of the optical efficiency enhancement layer 140 is shown to have a quadrangular shape similarly to that of the input region IR, but this is only for illustration and the disclosure is not limited thereto. The optical efficiency enhancement layer 140 may have any shape in which a contour thereof horizontally surrounds the input region IR (or the input grating 120).

The optical efficiency enhancement layer 140 may be provided on the light guide plate 110 by an attachment operation, a coating operation, or the like. Accordingly, the optical efficiency enhancement layer 140 may have a substantially constant thickness. The optical efficiency enhancement layer 140 may have a shape similar to that of the lower surface 110B of the light guide plate 110. For example, when the lower surface 110B of the light guide plate 110 is a flat plate, the optical efficiency enhancement layer 140 may be a flat layer, when the lower surface 110B of the light guide plate 110 is convex, the optical efficiency enhancement layer 140 may be a convex layer, and when the lower surface 110B of the light guide plate 110 is concave, the optical efficiency enhancement layer 140 may be a concave layer. However, the disclosure is not limited thereto. The optical efficiency enhancement layer 140 may also be formed to have a varying thickness to optimize an optical performance of the display device 100.

The input beam IB may be introduced into the light guide plate 110 from the input region IR of the light guide plate 110, and then total internal reflection may be repeated inside the light guide plate 110. The input beam IB may travel from the input region IR to the output region OR by repeating total internal reflection inside the light guide plate 110, and may then be emitted from the output region OR and directed to the user's eye UE. The input beam IB may be incident substantially perpendicular to the upper surface 110U of the light guide plate 110 in the input region IR, and may be emitted substantially perpendicular to the upper surface 110U of the light guide plate 110 from the output region OR.

The input grating 120 may include a periodic repetition of a geometric structure such as a dot pattern or a line and space pattern. The input grating 120 may be configured to diffract the input beam IB. A portion of the input beam IB may pass through the input grating 120 while being diffracted by the input grating 120 at the same time, and another portion of the input beam IB may pass through the input grating 120 without being diffracted by the input grating 120.

A portion of the input beam IB being diffracted by the input grating 120 and passing through the input grating 120, is referred to as a diffracted transmission beam DTB. The diffracted transmission beam DTB may be diffracted by the input grating 120 by a critical angle or more. Accordingly, the diffracted transmission beam DTB may travel to the output region OR by repeating total internal reflection within the light guide plate 110. A portion of the diffracted transmission beam DTB may be directed to the user's eye UE by the output grating 130.

A different portion of the input beam IB passing through the input grating 120, without being diffracted by the input grating 120, is referred to as a transmitted input beam TIB. The transmitted input beam TIB may not be diffracted by the input grating 120 by a critical angle or more. The transmitted input beam TIB may travel in substantially the same direction as the input beam IB within the light guide plate 110. The transmitted input beam TIB may then be reflected by the optical efficiency enhancement layer 140 back toward the input grating 120, and may then be reflected back into the light guide plate 110 by the input grating 120.

A portion of the transmitted input beam TIB may be diffracted by the input grating 120 while being reflected by the input grating 120. A portion of the transmitted input beam TIB being diffracted while being reflected by the input grating 120, is referred to as a first diffracted reflection beam DRB1 (see, e.g., FIG. 2). A diffraction angle of the first diffracted reflection beam DRB1 may be greater than a critical angle of the light guide plate 110. Accordingly, the first diffracted reflection beam DRB1 may travel to the output region OR by repeating total internal reflection within the light guide plate 110. A portion of the first diffracted reflection beam DRB1 may be directed to the user's eye UE by the output grating 130.

A portion of the diffracted transmission beam DTB and a portion of the first diffracted reflection beam DRB1 may be diffracted by the output grating 130 and directed at an angle less than a critical angle. Accordingly, a portion of the diffracted transmission beam DTB and a portion of the first diffracted reflection beam DRB1 may be emitted to the outside by passing through the output grating 130.

A portion of the diffracted transmission beam DTB passing through the output grating 130, is defined as the first output beam OB1, and a portion of the first diffracted reflection beam DRB1 passing through the output grating 130, is defined as the second output beam OB2. The first and second output beams OB1 and OB2 may be substantially parallel to the input beam IB, but are not limited thereto.

The optical efficiency enhancement layer 140 may reflect at least a portion of the transmitted input beam TIB. The optical efficiency enhancement layer 140 may include at least one of a narrowband reflection plate to be described below and a polarization reflection plate to be described below. In more detail, the optical efficiency enhancement layer 140 may include a narrowband reflection plate, a polarization reflection plate, or each of the narrowband reflection plate and the polarization reflection plate.

According to example embodiments, the optical efficiency enhancement layer 140 may include a first narrowband reflection plate configured to reflect a blue visible beam, a second narrowband reflection plate configured to reflect a green visible beam, and a third narrowband reflection plate configured to reflect a red visible beam. According to example embodiments, the optical efficiency enhancement layer 140 may include a stacked structure of the first to third narrowband reflection plates.

According to example embodiments, a reflectance of each of the first to third narrowband reflection plates may be about 50% or more. According to example embodiments, a reflection bandwidth of each of the first to third narrowband reflection plates may range from about 20 nm to about 100 nm. According to example embodiments, a reflection bandwidth of each of the first to third narrowband reflection plates may be about 80 nm or less. According to example embodiments, a reflection bandwidth of each of the first to third narrowband reflection plates may be about 60 nm or less. According to example embodiments, a reflection bandwidth of each of the first to third narrowband reflection plates may be about 40 nm or less. According to example embodiments, a reflection bandwidth of each of the first to third narrowband reflection plates may be about 40 nm.

According to example embodiments, when the optical efficiency enhancement layer 140 includes a narrowband reflection plate, only a small portion of natural light is reflected, so even when the user's eye views the surroundings through the display device 100, the user may not feel a sense of difference with the surrounding colors.

The polarization reflection plate may reflect any one of an S-polarized component of the transmitted input beam TIB, a P-polarized component of the transmitted input beam TIB, and a polarized component of the transmitted input beam TIB that is oblique to each of the S-polarized component and the P-polarized component. According to example embodiments, the polarization reflection plate may reflect about 50% or more of the transmitted input beam TIB.

As described above, the optical efficiency enhancement layer 140 may include a narrowband reflection plate or a polarization reflection plate which is configured to reflect about 50% or more of the transmitted input beam TIB. According to example embodiments, the optical efficiency enhancement layer 140 may reduce an intensity of the transmitted input beam TIB emitted to the outside by passing through the lower surface 110B of the light guide plate 110. Accordingly, the display device 100 with improved optical efficiency may be provided.

Figure 3:
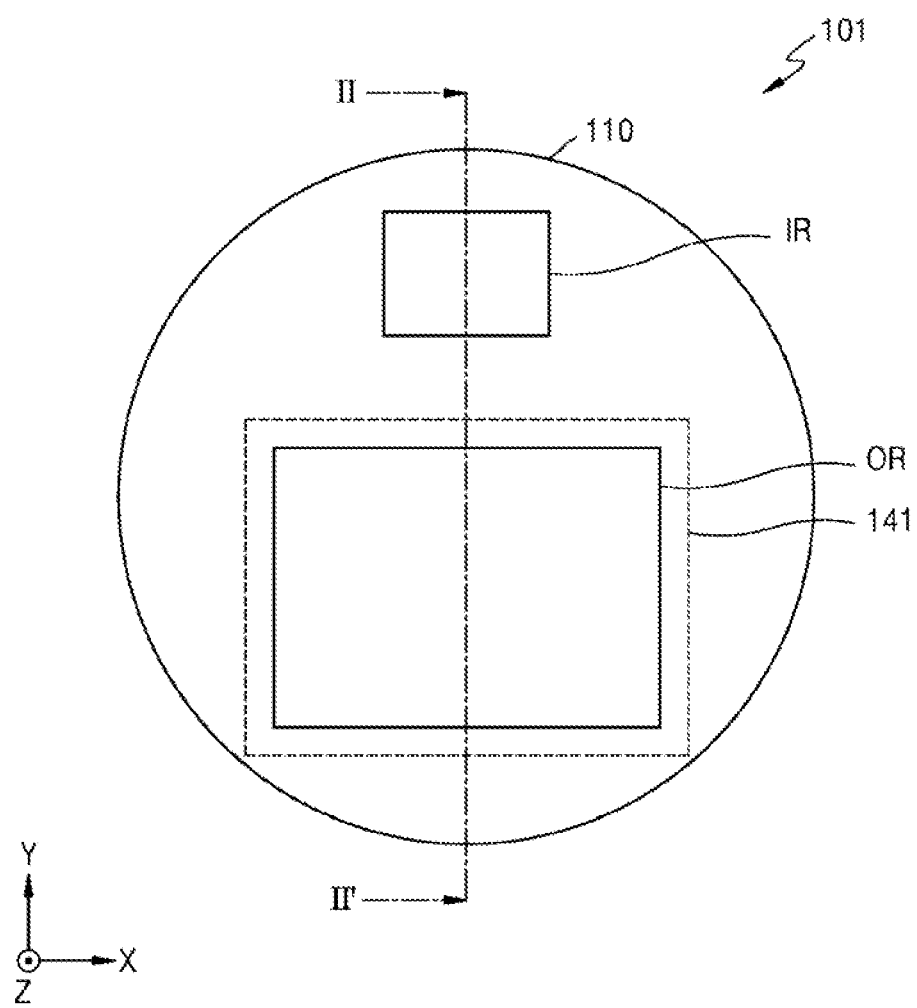
FIG. 3 is a plan view of a display device according to embodiments.

FIG. 3 is a plan view of a display device 101 according to example embodiments.

Figure 4:
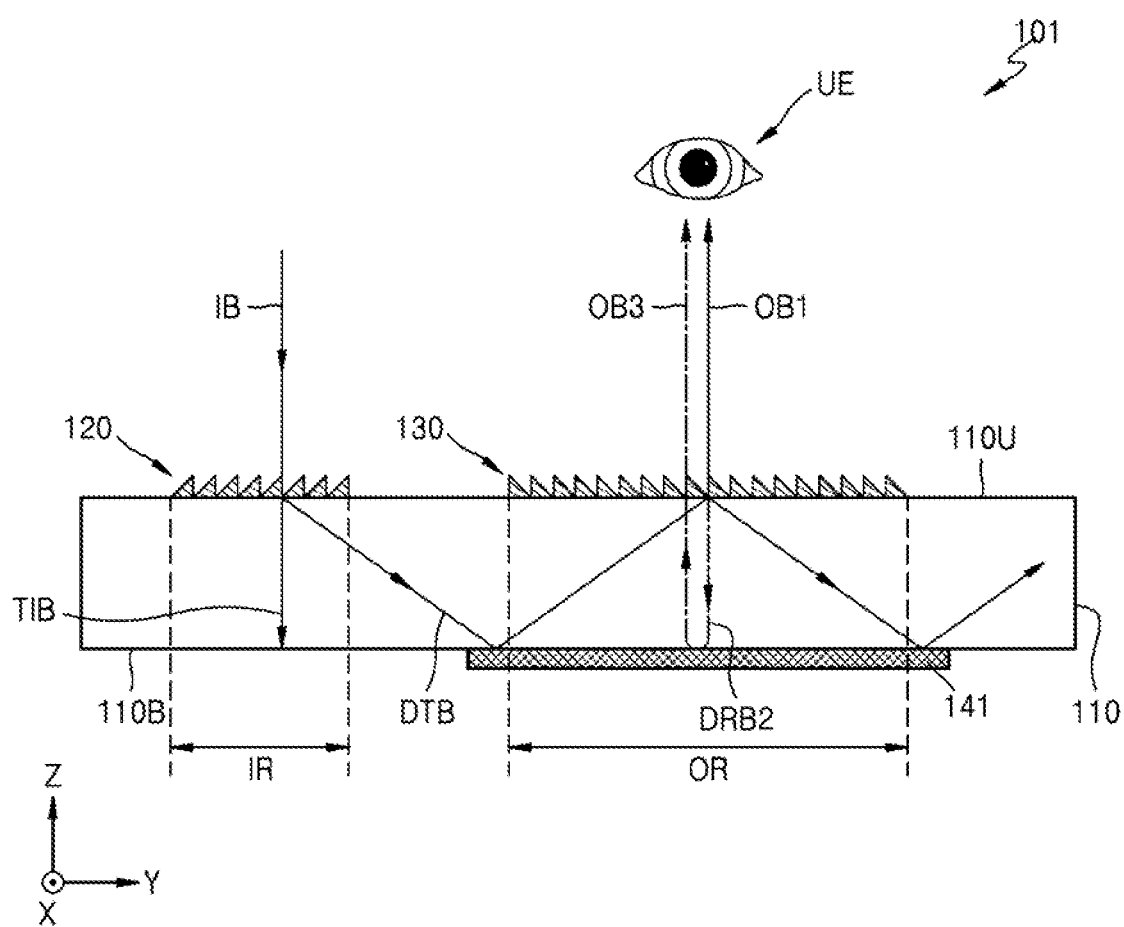
FIG. 4 is a cross-sectional view taken along line II-II' of FIG. 3.

FIG. 4 is a cross-sectional view taken along line II-II' of FIG. 3.

For convenience of description, redundant descriptions with those given above with reference to FIGS. 1 and 2 are omitted, and differences therebetween are mainly described.

Referring to FIGS. 3 and 4, the display device 101 may include the light guide plate 110, the input grating 120, and the output grating 130, similarly to the display device 100 of FIG. 1. According to example embodiments, the display device 101 may further include an optical efficiency enhancement layer 141.

According to example embodiments, the optical efficiency enhancement layer 141 may be on the lower surface 110B of the light guide plate 110. According to example embodiments, the optical efficiency enhancement layer 141 may overlap the output grating 130 in the Z direction. According to example embodiments, an area of the optical efficiency enhancement layer 141 may be greater than an area of the output region OR (or the output grating 130). According to example embodiments, a contour of the optical efficiency enhancement layer 141 may horizontally surround the output region OR (or the output grating 130) when viewed in the Z direction as shown, e.g., in FIG. 3.

In FIGS. 3 and 4, a planar shape of the optical efficiency enhancement layer 141 is shown to have a quadrangular shape similar to that of the output region OR, but this is only for illustration and the disclosure is not limited thereto. The optical efficiency enhancement layer 141 may have any shape in which a contour thereof horizontally surrounds the output region OR (or the output grating 130) when viewed in the Z direction. In addition, both of the optical efficiency enhancement layer 140 (refer to FIG. 1) arranged on the lower surface 110B of the light guide plate 110 and overlapping the input region IR and the optical efficiency enhancement layer 141 arranged on the lower surface 110B of the light guide plate 110 and overlapping the output region OR may be provided, based on the descriptions made with reference to FIGS. 1 to 4.

Similar to the optical efficiency enhancement layer 140 described with reference to FIGS. 1 and 2, the optical efficiency enhancement layer 141 may include at least one of a narrowband reflection plate and a polarization reflection plate, and thus a redundant description thereof is omitted.

According to example embodiments, a portion of the diffracted transmission beam DTB may be output as the first output beam OB1 by the output grating 130, a portion of the diffracted transmission beam DTB may travel along the light guide plate 110 without being emitted from the output region OR, and a portion of the diffracted transmission beam DTB may be both diffracted and reflected by the output grating 130. The portion of the diffracted transmission beam DTB being reflected and diffracted by the output grating 130, is defined as a second diffracted reflection beam DRB2.

According to example embodiments, the optical efficiency enhancement layer 141 may reflect the second diffracted reflection beam DRB2. The second diffracted reflection beam DRB2 reflected by the optical efficiency enhancement layer 141 may then be output as a third output beam OB3 by passing through the output grating 130. The third output beam OB3 may be substantially parallel to the input beam IB, but is not limited thereto.

Figure 5:
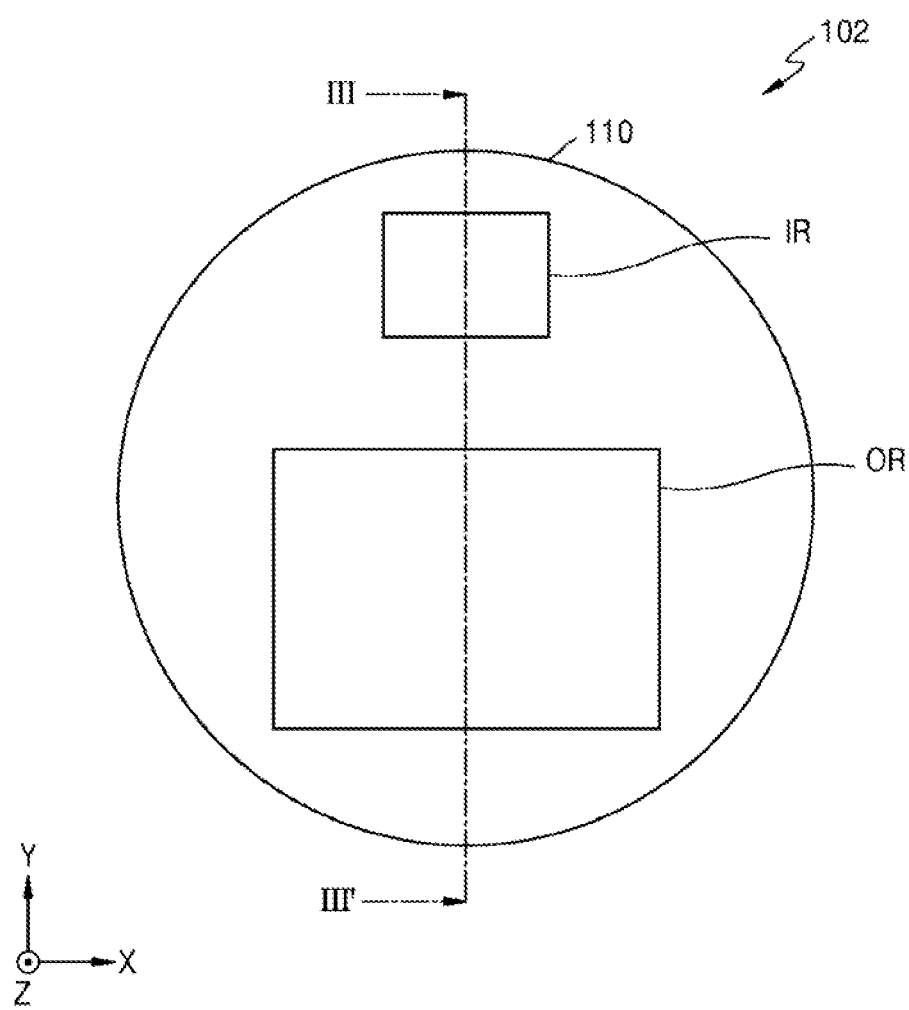
FIG. 5 is a plan view of a display device according to embodiments.

According to example embodiments, the optical efficiency enhancement layer 141 may reduce light loss caused by the second diffracted reflection beam DRB2 reflected and diffracted by the output grating 130 being emitted to the lower surface 110B of the light guide plate 110. Accordingly, the display device 101 with improved optical efficiency may be provided. FIG. 5 is a plan view of a display device 102 according to example embodiments.

Figure 6:
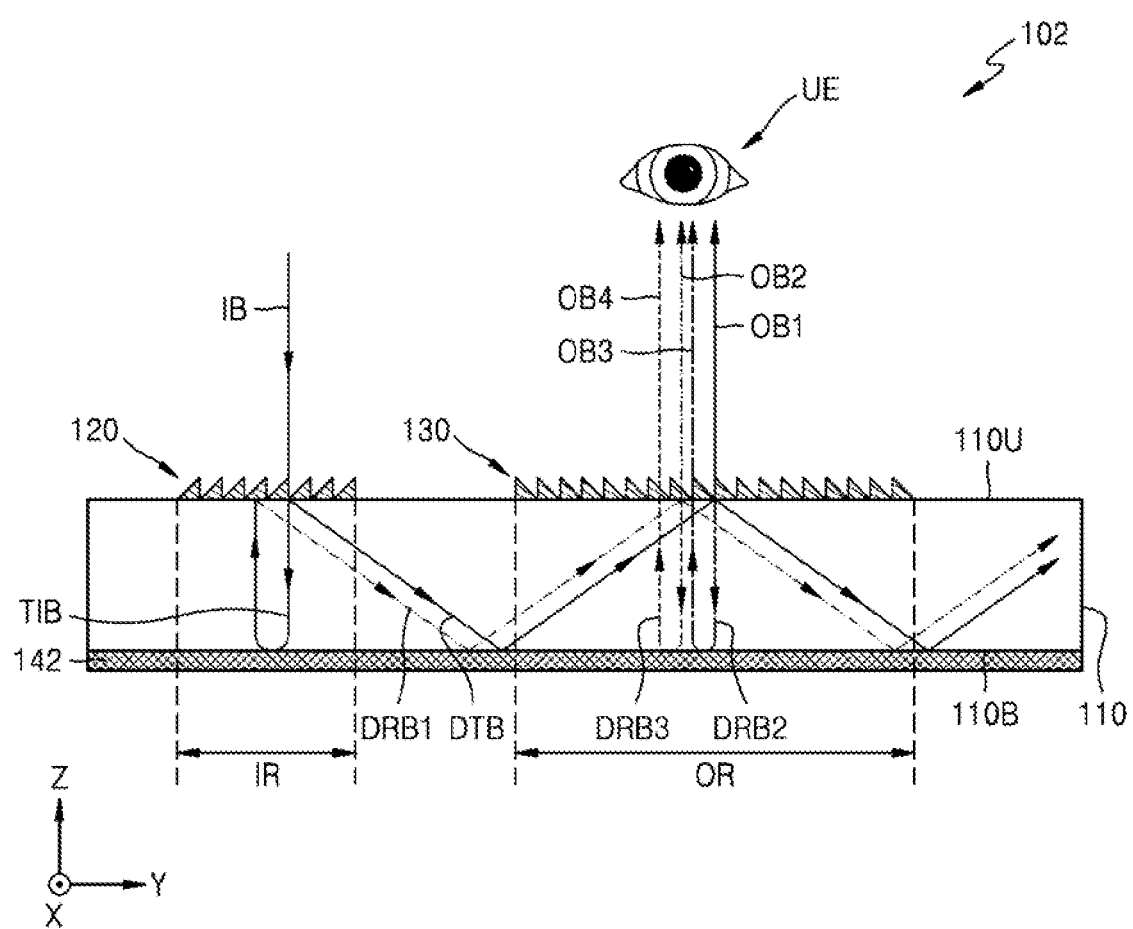
FIG. 6 is a cross-sectional view taken along line III-III' of FIG. 5.

FIG. 6 is a cross-sectional view taken along line III-III' of FIG. 5.

For convenience of description, redundant descriptions with those given above with reference to FIGS. 1 and 2 are omitted, and differences therebetween are mainly described.

Referring to FIGS. 5 and 6, the display device 102 may include the light guide plate 110, the input grating 120, and the output grating 130, similarly to the display device 100 of FIG. 1. The display device 102 may further include an optical efficiency enhancement layer 142.

According to example embodiments, the optical efficiency enhancement layer 142 may be on the lower surface 110B of the light guide plate 110. According to example embodiments, the optical efficiency enhancement layer 142 may overlap the input grating 120 and the output grating 130 in the Z direction. According to example embodiments, an area of the optical efficiency enhancement layer 142 may be greater than a sum of an area of the input region IR (or the input grating 120) and an area of the output region OR (or the output grating 130). According to example embodiments, the optical efficiency enhancement layer 142 may be formed on the entire lower surface 110B of the light guide plate 110. According to example embodiments, the optical efficiency enhancement layer 142 may entirely cover the lower surface 110B of the light guide plate 110.

Similar to the optical efficiency enhancement layer 140 described with reference to FIGS. 1 and 2, the optical efficiency enhancement layer 142 may include at least one of a narrowband reflection plate and a polarization reflection plate, and thus a redundant description thereof is omitted.

According to example embodiments, a portion of the first diffracted reflection beam DRB1 may be output as the second output beam OB2 by the output grating 130, another portion of the first diffracted reflection beam DRB1 may travel along the light guide plate 110 without being output from the output region OR, and yet another portion of the first diffracted reflection beam DRB1 may be both diffracted and reflected by the output grating 130. The portion of the first diffracted reflection beam DRB1 being reflected and diffracted by the output grating 130, is defined as a third diffracted reflection beam DRB3.

According to example embodiments, the optical efficiency enhancement layer 142 may reflect the third diffracted reflection beam DRB3. The third diffracted reflection beam DRB3 reflected by the optical efficiency enhancement layer 142 may be output as a fourth output beam OB4 by passing through the output grating 130. The fourth output beam OB4 may be substantially parallel to the input beam IB, but is not limited thereto.

According to example embodiments, the optical efficiency enhancement layer 142 may reduce light loss caused by the transmitted input beam TIB and the second and third diffracted reflection beams DRB2 and DRB3 being emitted through the lower surface 110B of the light guide plate 110. Accordingly, the display device 102 with improved optical efficiency may be provided.

Figure 7:
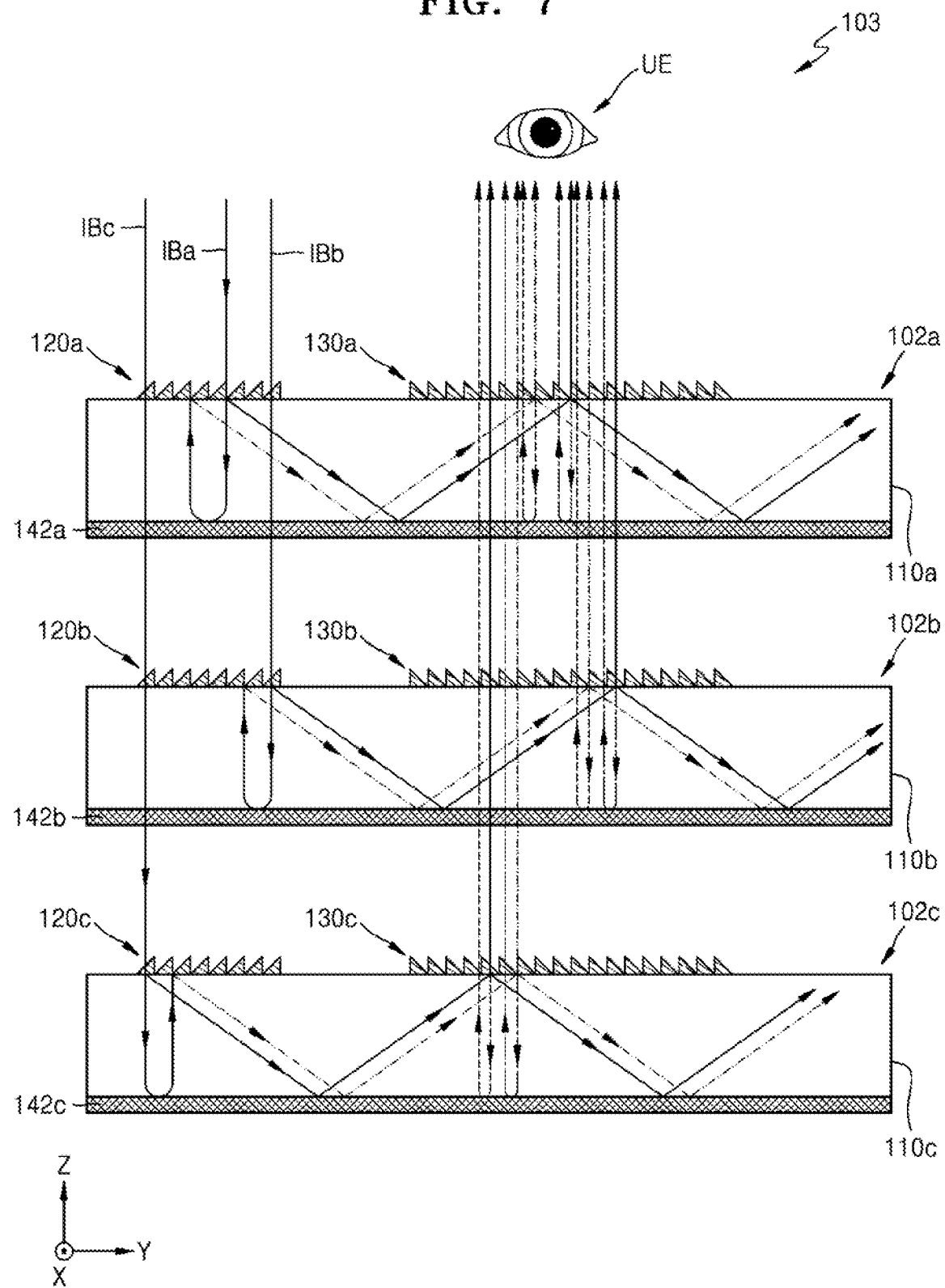
FIG. 7 is a cross-sectional view of a display device according to embodiments.

FIG. 7 is a cross-sectional view of a display device 103 according to example embodiments.

For convenience of description, redundant descriptions with those given above with reference to FIGS. 1, 2, and 6 are omitted, and differences therebetween are mainly described.

According to example embodiments, the display device 103 may include first to third display devices 102a, 102b, and 102c. A configuration of each of the first to third display devices 102a, 102b, and 102c may be similar to the that of the display device 102 shown in FIGS. 5 and 6.

The first to third display devices 102a, 102b, and 102c may respectively correspond to input beams IBa, IBb, and IBc which have different wavelength bands. For example, the first display device 102a may correspond to the first input beam IBa having a first wavelength band, the second display device 102b may correspond to the second input beam IBb having a second wavelength band, and the third display device 102c may correspond to the third input beam IBc having a third wavelength band.

According to example embodiments, the first input beam IBa may be a blue visible beam, the second input beam IBb may be a green visible beam, and the third input beam IBc may be a red visible beam.

According to example embodiments, the first display device 102a may include a first light guide plate 110a, a first input grating 120a, a first output grating 130a, and a first optical efficiency enhancement layer 142a.

According to example embodiments, the first light guide plate 110a, the first input grating 120a, the first output grating 130a, and the first optical efficiency enhancement layer 142a may each have optical characteristics optimized for a wavelength band of the first input beam IBa. In more detail, a refractive index of the first light guide plate 110a, and a period, dimension, and composition of each of the first input grating 120a and the first output grating 130a may be configured to optimize the incidence of the first input beam IBa on the first light guide plate 110a, the progress of total internal reflection within the first light guide plate 110a, and the output from the first light guide plate 110a.

According to example embodiments, the first optical efficiency enhancement layer 142a may be a band reflection filter configured to reflect a beam having a set wavelength band. According to example embodiments, a reflection band of the first optical efficiency enhancement layer 142a may include the wavelength band of the first input beam IBa. According to example embodiments, the first optical efficiency enhancement layer 142a may be configured to reflect a blue visible beam. The first optical efficiency enhancement layer 142a may be substantially transparent to the second and third input beams IBb and IBc. According to example embodiments, a reflectance of the first optical efficiency enhancement layer 142a with respect to a reflection band may be about 50% or more.

According to example embodiments, a reflection bandwidth of the first optical efficiency enhancement layer 142a may range from about 20 nm to about 100 nm. According to example embodiments, a reflection bandwidth of the first optical efficiency enhancement layer 142a may be about 80 nm or less. According to example embodiments, a reflection bandwidth of the first optical efficiency enhancement layer 142a may be about 60 nm or less. According to example embodiments, a reflection bandwidth of the first optical efficiency enhancement layer 142a may be about 40 nm or less. According to example embodiments, a reflection bandwidth of the first optical efficiency enhancement layer 142a may be about 40 nm.

According to example embodiments, the second display device 102b may include a second light guide plate 110b, a second input grating 120b, a second output grating 130b, and a second optical efficiency enhancement layer 142b.

According to example embodiments, the second light guide plate 110b, the second input grating 120b, the second output grating 130b, and the second optical efficiency enhancement layer 142b may each have optical characteristics optimized for a wavelength band of the second input beam IBb. In more detail, a refractive index of the second light guide plate 110b, and a period, dimension, and composition of each of the second input grating 120b and the second output grating 130b may be configured to optimize the incidence of the second input beam IBb on the second light guide plate 110b, the progress of total internal reflection within the second light guide plate 110b, and the output from the second light guide plate 110b.

According to example embodiments, a reflection band of the second optical efficiency enhancement layer 142b may include the wavelength band of the second input beam IBb. According to example embodiments, the second optical efficiency enhancement layer 142b may be configured to reflect a green visible beam. According to example embodiments, the second optical efficiency enhancement layer 142b may be substantially transparent to the first and third input beams IBa and IBc. According to example embodiments, a reflectance of the second optical efficiency enhancement layer 142b with respect to a reflection band may be about 50% or more.

According to example embodiments, a reflection bandwidth of the second optical efficiency enhancement layer 142b may range from about 20 nm to about 100 nm. According to example embodiments, a reflection bandwidth of the second optical efficiency enhancement layer 142b may be about 80 nm or less. According to example embodiments, a reflection bandwidth of the second optical efficiency enhancement layer 142b may be about 60 nm or less. According to example embodiments, a reflection bandwidth of the second optical efficiency enhancement layer 142b may be about 40 nm or less. According to example embodiments, a reflection bandwidth of the second optical efficiency enhancement layer 142b may be about 40 nm.

According to example embodiments, the third display device 102c may include a third light guide plate 110c, a third input grating 120c, a third output grating 130c, and a third optical efficiency enhancement layer 142c.

According to example embodiments, the third light guide plate 110c, the third input grating 120c, the third output grating 130c, and the third optical efficiency enhancement layer 142c may each have optical characteristics optimized for a wavelength band of the third input beam IBc. In more detail, a refractive index of the third light guide plate 110c, and a period, dimension, and composition of the third input grating 120c and the third output grating 130c may be configured to optimize the incidence of the third input beam IBc on the third light guide plate 110c, the progress of total internal reflection within the third light guide plate 110c, and the output from the third light guide plate 110c.

According to example embodiments, a reflection band of the third optical efficiency enhancement layer 142c may include the wavelength band of the third input beam IBc. According to example embodiments, the third optical efficiency enhancement layer 142c may be configured to reflect a red visible beam. According to example embodiments, the third optical efficiency enhancement layer 142c may be substantially transparent to the first and second input beams IBa and IBb. According to example embodiments, a reflectance of the third optical efficiency enhancement layer 142c with respect to a reflection band may be about 50% or more.

According to example embodiments, a reflection bandwidth of the third optical efficiency enhancement layer 142c may range from about 20 nm to about 100 nm. According to example embodiments, a reflection bandwidth of the third optical efficiency enhancement layer 142c may be about 80 nm or less. According to example embodiments, a reflection bandwidth of the third optical efficiency enhancement layer 142c may be about 60 nm or less. According to example embodiments, a reflection bandwidth of the third optical efficiency enhancement layer 142c may be about 40 nm or less. According to example embodiments, a reflection bandwidth of the third optical efficiency enhancement layer 142c may be about 40 nm.

According to example embodiments, an optical performance of the display device 103 may be improved by providing the first to third display devices 102a, 102b, and 102c having optical designs respectively optimized for the first to third input beams IBa, IBb, and IBc.

According to example embodiments, the first to third input gratings 120a, 120b, and 120c may overlap in a traveling direction of the first to third input beams IBa, IBb, and IBc.

According to example embodiments, the first to third output gratings 130a, 130b, and 130c may overlap in a traveling direction of the first to third input beams IBa, IBb, and IBc.

According to example embodiments, a progress of the first input beam IBa introduced into the first display device 102a, a progress of the second input beam IBb introduced into the second display device 102b, and a progress of the third input beam IBc introduced into the third display device 102c may be similar to that described with respect to the input beam IB introduced into the display device 102 with reference to FIGS. 5 and 6, and thus a redundant description thereof is omitted.

Figure 8:
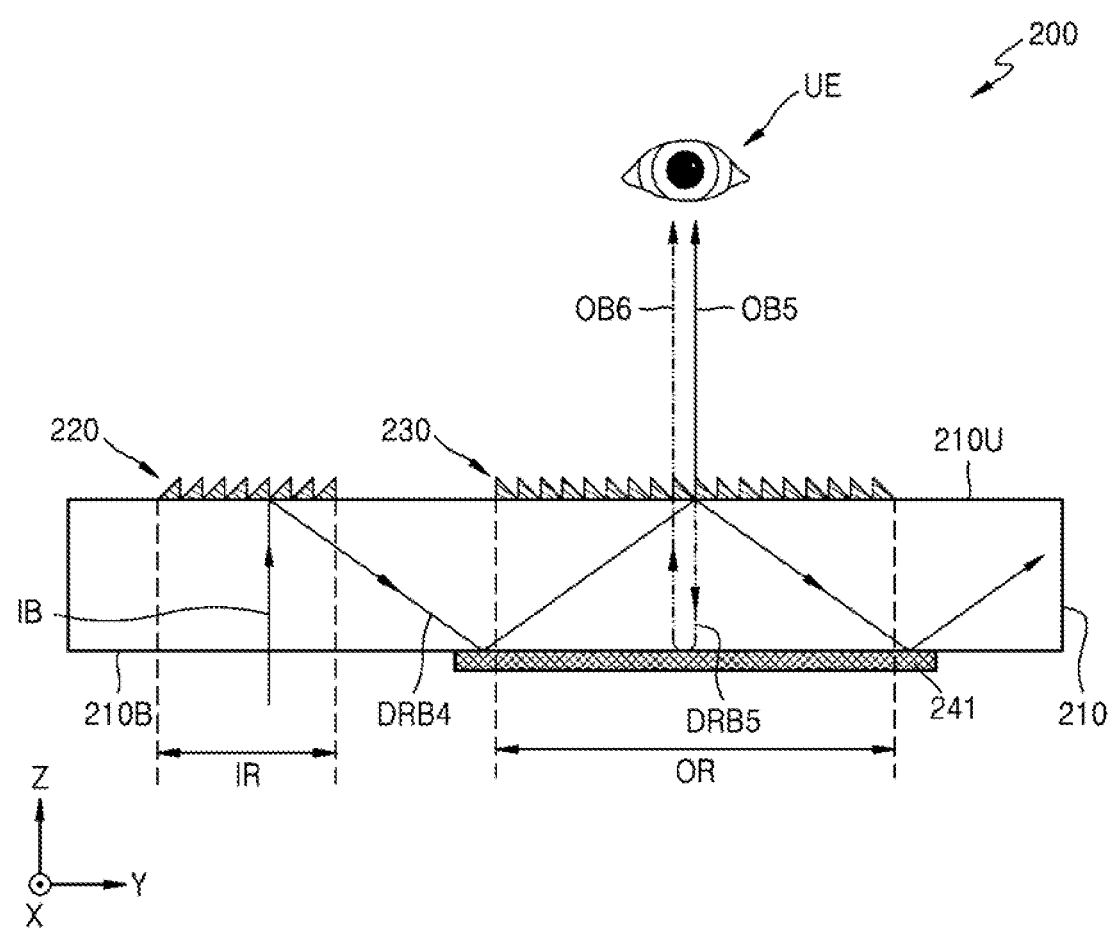
FIG. 8 is a cross-sectional view of a display device according to embodiments.

FIG. 8 is a cross-sectional view of a display device 200 according to example embodiments.

Referring to FIG. 8, the display device 200 may include a light guide plate 210, an input grating 220, an output grating 230, and an optical efficiency enhancement layer 241.

According to example embodiments, a configuration and arrangement of the display device 200 of FIG. 8 are similar to those of the display device 101 shown in FIGS. 3 and 4, except that the input beam IB may be introduced from a lower surface 210B of the light guide plate 210, which is opposite to an upper surface 210U of the light guide plate 210, the upper surface 210U facing the user's eye UE.

According to example embodiments, the light guide plate 210 may be similar to the light guide plate 110 (refer to FIG. 4), the input grating 220 may be similar to the input grating 120 (refer to FIG. 4), the output grating 230 may be similar to the output grating 130 (refer to FIG. 4), and the optical efficiency enhancement layer 241 may be similar to the optical efficiency enhancement layer 141 (refer to FIG. 4).

According to example embodiments, a portion of the input beam IB may be both diffracted and reflected by the input grating 220. According to example embodiments, the portion of the input beam IB being reflected and diffracted by the input grating 220, is defined as a fourth diffracted reflection beam DRB4.

According to example embodiments, a diffraction angle of the fourth diffracted reflection beam DRB4 may be greater than or equal to a critical angle of the light guide plate 210. According to example embodiments, the fourth diffracted reflection beam DRB4 may travel from the input region IR to the output region OR through total internal reflection.

According to example embodiments, a portion of the fourth diffracted reflection beam DRB4 may be both diffracted and emitted by the output grating 230 in the output region OR, as a fifth output beam OB5 by passing through the output grating 230. According to example embodiments, the fifth output beam OB5 may be directed to the user's eye UE.

According to example embodiments, a portion of the fourth diffracted reflection beam DRB4 may be both diffracted and reflected by the output grating 230 in the output region OR. The portion of the fourth diffracted reflection beam DRB4 being diffracted and reflected by the output grating 230, is defined as a fifth diffracted reflection beam DRB5.

According to example embodiments, the optical efficiency enhancement layer 241 may reflect the fifth diffracted reflection beam DRB5. The fifth diffracted reflection beam DRB5 reflected by the optical efficiency enhancement layer 241 may then be output as a sixth output beam OB6 by passing through the output grating 230. The sixth output beam OB6 may be directed to the user's eye UE.

According to example embodiments, the optical efficiency enhancement layer 241 may reduce light loss caused by the fifth diffracted reflection beam DRB5 being emitted through the lower surface 210B of the light guide plate 210. Accordingly, the display device 200 with improved optical efficiency may be provided.

Figure 9:
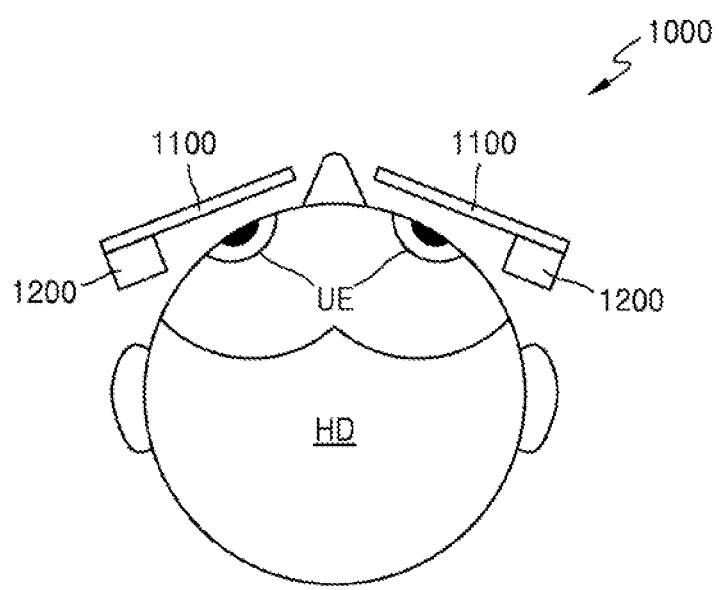
FIG. 9 is a diagram of a head-mounted display (HMD) according to embodiments.

FIG. 9 is a diagram of a head-mounted device (HMD) 1000 according to example embodiments.

Referring to FIG. 9, the HMD 1000 may include image generating devices 1200, which serve as light sources, and display devices 1100.

Each of the display devices 1100 may be any one of the display devices 100, 101, 102, and 103 described with reference to FIGS. 1 to 7. According to example embodiments, the image generating devices 1200 may each be a display device such as an organic EL display, an inorganic EL display, an LCD, or the like. According to example embodiments, the HMD 1000 may include a pair of display devices 1100 and image generating devices 1200 respectively corresponding to the user's two eyes UE.

According to example embodiments, the HMD 1000 may have a shape similar to glasses, and may be mounted on the user's head HD in a manner similar to glasses. According to example embodiments, the display device 1100 may serve a role similar to that of a lens of glasses, and may generate a virtual image directed to the user's eye UE.

According to example embodiments, by providing the HMD 1000 including the display devices 100, 101, 102, and 103 described with reference to FIGS. 1 to 7, the user does not feel a sense of difference even when viewing an external landscape and a virtual image at the same time, and thus a high level of user experience may be provided.

Figure 10:
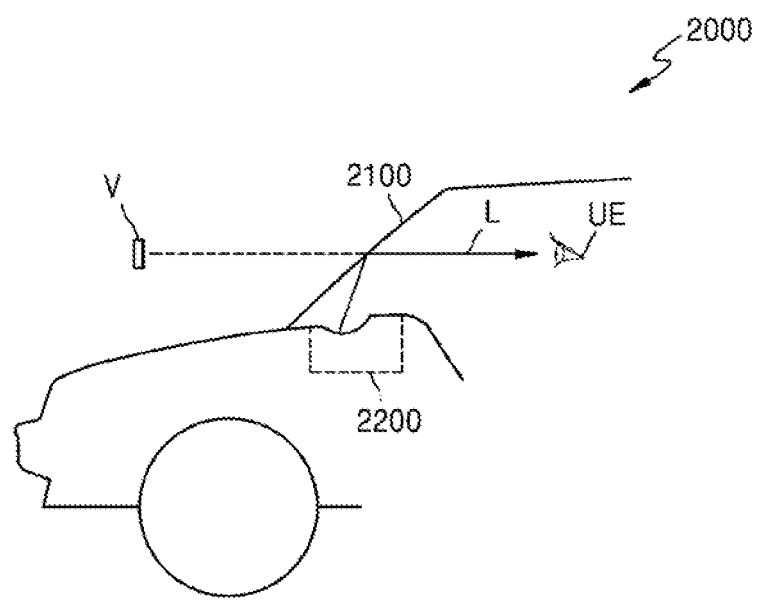
FIG. 10 is a diagram of a head-up display (HUD) according to embodiments.

FIG. 10 is a diagram of a head-up display (HUD) 2000 according to example embodiments.

Referring to FIG. 10, the HUD 2000 may include a display device 2100 forming at least a portion of a windshield of a vehicle and an image generating device 2200 installed in a dashboard of the vehicle. Display light L projected by the HUD 2000 may be directed to the user's eye UE by the display device 2100. Accordingly, the user may recognize a virtual image V overlapping a landscape viewed through the windshield of the vehicle.

According to example embodiments, the display device 2000 may be the display device 200 of FIG. 8. According to example embodiments, by providing the HUD 2000 including the display device 200 described with reference to FIG. 8, the user does not feel a sense of difference when viewing a virtual image and a landscape outside a window at the same time, and thus a risk of accidents may be lowered, and a high level of user experience may be provided.

While the disclosure has been particularly shown and described with reference to embodiments thereof, it will be understood that various changes in form and details may be made therein without departing from the spirit and scope of the following claims.

What is claimed is:

1. A display device comprising:
a light guide plate;
an input grating on a first surface of the light guide plate, the input grating being configured to diffract an input beam incident on the first surface at an angle equal to or greater than a critical angle of the light guide plate to generate a diffracted transmission beam propagating within the light guide plate through total internal reflection;
an output grating on the first surface of the light guide plate and spaced apart from the input grating, wherein the output grating is configured to generate a first output beam passing through the output grating and emitted from the light guide plate by diffracting the diffracted transmission beam; and
an optical efficiency enhancement layer on a second surface of the light guide plate and overlapping the output grating in a traveling direction of the input beam, the second surface being opposite to the first surface,
wherein the optical efficiency enhancement layer comprises a polarization reflection plate and a narrowband reflection plate directly on the polarization reflection plate,
wherein the traveling direction of the input beam is substantially perpendicular to a first direction,
wherein a width of the optical efficiency enhancement layer in the first direction is greater than a width of the output grating in the first direction,
wherein the width of the output grating in the first direction is within the width of the optical efficiency enhancement layer in the first direction, and
wherein the width of the optical efficiency enhancement layer in the first direction is less than a width of the light guide plate in the first direction.

2. The display device of claim 1, wherein a reflectance of the optical efficiency enhancement layer with respect to the input beam is 50% or more.

3. The display device of claim 1, wherein a reflection bandwidth of the narrowband reflection plate is 40 nm or less.

4. The display device of claim 1, wherein the optical efficiency enhancement layer comprises:
a first narrowband reflection plate configured to reflect a blue visible beam;
a second narrowband reflection plate configured to reflect a green visible beam; and
a third narrowband reflection plate configured to reflect a red visible beam.

5. The display device of claim 1, wherein the input grating is configured to transmit a portion of the input beam passing through the input grating and traveling in substantially a same direction as the traveling direction of the input beam within the light guide plate, and
wherein the optical efficiency enhancement layer is configured to reflect the transmitted portion of the input beam.

6. The display device of claim 1, wherein the output grating is further configured to diffract and reflect a portion of the diffracted transmission beam toward the optical efficiency enhancement layer, and
wherein the optical efficiency enhancement layer is configured to reflect the portion of the diffracted transmission beam back toward the output grating.

7. A display device configured to output a first output beam and a second output beam based on an input beam, the display device comprising:
a light guide plate;
an input grating on a first surface of the light guide plate;
an output grating on the first surface of the light guide plate and spaced apart from the input grating; and
an optical efficiency enhancement layer arranged on a second surface of the light guide plate, the optical efficiency enhancement layer having a reflectance of 50% or more with respect to the input beam,
wherein the first output beam is based on a diffracted transmission beam which is a first portion of the input beam diffracted by the input grating while passing through the input grating,
wherein the second output beam is based on a transmitted input beam which is a second portion of the input beam passing through the input grating and reflected by the optical efficiency enhancement layer, wherein the first output beam is a portion of the diffracted transmission beam diffracted by the output grating,
wherein the second output beam is based on a first diffracted reflection beam which is a portion of the transmitted input beam that is diffracted and reflected by the input grating after being reflected by the optical efficiency enhancement layer,
wherein a traveling direction of the input beam is substantially perpendicular to a first direction,
wherein a width of the optical efficiency enhancement layer in the first direction is greater than a width of the output grating in the first direction,
wherein the width of the output grating in the first direction is within the width of the optical efficiency enhancement layer in the first direction,
wherein the optical efficiency enhancement layer entirely covers the second surface of the light guide plate, and
wherein the optical efficiency enhancement layer comprises a polarization reflection plate and a narrowband reflection plate directly on the polarization reflection plate.

8. The display device of claim 7, wherein the second output beam is a portion of the first diffracted reflection beam diffracted by the output grating while passing through the output grating.

9. The display device of claim 7, wherein the second output beam is based on a second diffracted reflection beam which is a portion of the transmitted input beam diffracted and reflected by the output grating.

10. The display device of claim 9, wherein the second output beam is a portion of the second diffracted reflection beam passing through the output grating.

11. A display device comprising:
a first display device corresponding to a first input beam, a second display device corresponding to a second input beam, and a third display device corresponding to a third input beam,
wherein the first display device comprises:
  a first light guide plate;
  a first input grating on a first upper surface of the first light guide plate;
  a first output grating on the first upper surface of the first light guide plate and spaced apart from the first input grating; and
  a first optical efficiency enhancement layer on a first lower surface of the first light guide plate and being farther from a user's eye than the first upper surface, the first optical efficiency enhancement layer having a reflectance of 50% or more with respect to a first wavelength band of the first input beam, the first lower surface being opposite to the first upper surface,
wherein the second display device comprises:
  a second light guide plate;
  a second input grating on a second upper surface of the second light guide plate;
  a second output grating on the second upper surface of the second light guide plate and spaced apart from the second input grating; and
  a second optical efficiency enhancement layer on a second lower surface of the second light guide plate, the second optical efficiency enhancement layer having a reflectance of 50% or more with respect to a second wavelength band of the second input beam, the second lower surface being opposite to the second upper surface,
wherein the third display device comprises:
  a third light guide plate;
  a third input grating on a third upper surface of the third light guide plate;
  a third output grating on the third upper surface of the third light guide plate and spaced apart from the third input grating; and
  a third optical efficiency enhancement layer on a third lower surface of the third light guide plate, the third optical efficiency enhancement layer having a reflectance of 50% or more with respect to a third wavelength band of the third input beam, the third lower surface being opposite to the third upper surface,
wherein the first input beam comprises a blue visible beam,
wherein the second input beam comprises a green visible beam,
wherein the third input beam comprises a red visible beam,
wherein at least one of the first optical efficiency enhancement layer, the second optical efficiency enhancement layer, and the third optical efficiency enhancement layer comprises a polarization reflection plate and a narrowband reflection plate directly on the polarization reflection plate,
wherein a traveling direction of the first input beam is substantially perpendicular to a first direction,
wherein a width of the first optical efficiency enhancement layer in the first direction is greater than a width of the first output grating in the first direction,
wherein the width of the first output grating in the first direction is within the width of the first optical efficiency enhancement layer in the first direction, and
wherein the width of the first optical efficiency enhancement layer in the first direction is less than a width of the first light guide plate in the first direction.

12. The display device of claim 11, wherein the first optical efficiency enhancement layer is transparent to each of the second and third input beams,
wherein the second optical efficiency enhancement layer is transparent to each of the first and third input beams, and
wherein the third optical efficiency enhancement layer is transparent to each of the first and second input beams.

* * * * *